(12) United States Patent  
Vroege et al.

(10) Patent No.: US 8,443,658 B2  
(45) Date of Patent: May 21, 2013

(54) LINER INSPECTION TOOL AND METHOD OF INSPECTING A CYLINDER LINER

(75) Inventors: Jan Willem Vroege, Tschiertschen (CH); Gregory Sudwoj, Sulz-Rickenbach (CH)

(73) Assignee: Waertsilae Schweiz AG, Winterthur (CH)

( * ) Notice: Subject to any disclaimer, the term of this patent is extended or adjusted under 35 U.S.C. 154(b) by 379 days.

(21) Appl. No.: 12/759,124

(22) Filed: Apr. 13, 2010

(65) Prior Publication Data

US 2010/0313642 A1 Dec. 16, 2010

(30) Foreign Application Priority Data

Jun. 11, 2009 (EP) .................................... 09162500

(51) Int. Cl.  
*G01M 15/02* (2006.01)

(52) U.S. Cl.  
USPC ...................................................... 73/114.77

(58) Field of Classification Search  
USPC ........................................ 73/114.77, 114.78  
See application file for complete search history.

(56) References Cited

U.S. PATENT DOCUMENTS

| 4,123,943 | A  | * | 11/1978 | Roddy et al. .................... 73/623 |
| 4,393,698 | A  |   | 7/1983  | Pietzsch et al. |
| 5,675,076 | A  | * | 10/1997 | Esch et al. ................. 73/114.77 |
| 6,889,541 | B1 | * | 5/2005  | Kang .......................... 73/114.77 |
| 7,851,046 | B2 | * | 12/2010 | Nishimura et al. ........... 428/141 |
| 2005/0087005 | A1 | * | 4/2005 | Kang .......................... 73/119 R |
| 2007/0212519 | A1 | * | 9/2007 | Nishimura et al. ........... 428/131 |
| 2011/0132079 | A1 | * | 6/2011 | Huttner ...................... 73/114.78 |

FOREIGN PATENT DOCUMENTS

DE 10 2007 012654 9/2008  
WO WO 99/15853 A1 4/1999

* cited by examiner

*Primary Examiner* — Eric S McCall  
(74) *Attorney, Agent, or Firm* — Kilpatrick Townsend & Stockton LLP

(57) ABSTRACT

The invention relates to a method and a device (50) for inspecting a running surface (35) of a cylinder liner (25) of a combustion engine (10) comprising an inspection tool (65), a control device (55) and connection means (60) for power supply and transmission of measuring data and control signals. The inspection tool (65) comprises a bearing rail (70) and mounted thereon a rotary table (80) and tools (90, 96) for measuring the inner diameter (d) and running surface (35) of the cylinder liner (25) and for visual inspection of the surface condition. The inspection tool (65) has a size that allows its introduction into the cylinder liner (25) through an aperture (30) in the cylinder liner (25) to be inspected. The invention is particular suitable for the inspection of a cylinder liner (25) of a reciprocating piston combustion engine (10).

22 Claims, 4 Drawing Sheets

LINER INSPECTION TOOL AND METHOD OF INSPECTING A CYLINDER LINER

BACKGROUND OF THE INVENTION

This application claims the priority of European Application No. 09 162 500.4, filed on Jun. 11, 2009, the disclosure of which is incorporated herein by reference.

The invention relates to an inspection device for inspecting a running surface of a cylinder liner of a combustion engine. The invention further relates to a method of inspecting a running surface of a cylinder liner of a combustion engine.

Running surfaces of reciprocating piston combustion engines, such as for example of large diesel engines for ships or stationary installations for the production of electrical energy, have to be inspected in regular intervals. For effecting such an inspection the cylinder cover of the cylinder liner has to be removed in order to introduce appropriate inspection tools into the cylinder liner. Taking in mind that removing a cylinder cover from a large diesel engine may take several hours, such an inspection is greatly time consuming. In particular for the inspection of the running surface of a cylinder liner of a reciprocating piston combustion engines of e.g. a container ship, such an inspection is associated with a long downtime of the engine and therefore also of the ship.

BRIEF SUMMARY OF THE INVENTION

It is an object of the present invention to provide an inspection device for inspecting a running surface of a cylinder liner of a combustion engine that renders possible shorter downtimes of those engines.

A further object of the present invention is to provide a method of inspecting a running surface of a cylinder liner of a combustion engine using such an inspection device.

The inspection device according to the invention is for inspecting a running surface of a cylinder liner of a combustion engine and comprises an inspection tool to be introduced into the cylinder liner to be inspected, a control device that usually is placed separate from the engine, and connection means for power supply and transmission of measuring data and control signals. The inspection tool itself comprises a bearing rail on which there are mounted a rotary table and tools for measuring the inner diameter and surface of the cylinder liner and for visual inspection of the surface condition. Essential for the inventive inspection tool is that it has a size that allows its introduction into the cylinder liner through an aperture in the cylinder liner to be inspected.

The aperture of the cylinder liner may concern a passage or through hole of any suitable cross-section or a through boring of the cylindric wall of the cylinder liner. In a preferred embodiment of the invention the aperture in the cylinder liner to be inspected is an air intake port, and in case of a cylinder liner of a two stroke large diesel engine the aperture preferably is a scavenging air port.

The connection means may also include coolant supply means for devices of the inspection tool.

The inspection device according to the invention allows the inspection of the running surface without the need of removing the cylinder cover of the cylinder whose cylinder liner has to be inspected. Accordingly, this inspection tool is used particular advantageously when an inspection of the cylinder liner is required and there is no time to lift or to remove the cylinder cover. This way, a huge amount of work can be avoided and the time needed for such an inspection is shortened considerably.

The individual measuring and visual inspection tools are available commercially. Hence, the inspection tool is easy to produce and depending on the software the inspection device is user friendly. The commercially available measuring and inspection devices are highly accurate so that an accurate inspection of the inside of a liner may be obtained in a very short time.

The inspection tool according to the invention is particularly suitable for inspecting the running surface of a cylinder liner of a cylinder of a reciprocating piston combustion engine of a two stroke large diesel engine with longitudinal scavenging wherein the inspection tool has a size that allows its introduction through the scavenging ports.

Until now, in order to inspect the cylinder liner of a reciprocating piston combustion engine of a two stroke large diesel engine with longitudinal scavenging, the cylinder cover of the cylinder has to be lifted or removed. Using the inspection device according to the invention only the scavenge air receiver has to be opened and the starting air valve or exhaust valve has to be removed.

Inspection tools according to the invention may also have sizes to be used for the inspection of smaller cylinder liners, i.e. for smaller bore engines.

The inspection device is for measuring the diameter and surface of the cylinder liner. A camera, especially a self illuminating camera, may be used as visual inspection tool for determining the surface condition of the running surface of the cylinder liner.

The inspection device according to the present invention is particularly suitable for the inspection of cylinder liners of reciprocating piston engines. A further preferred use of the inspection device is for inspecting a running surface of a cylinder liner of a cylinder of a reciprocating piston combustion engine of a two stroke large diesel engine with longitudinal scavenging in which cylinder a piston is arranged movably to and fro along the running surface.

The bearing rail of the inspection tool comprises at its central part a rotary table that is preferably mounted on a connecting element, e.g. a solenoid, for detachably affixing this connecting element onto the upper surface of a piston. The rotary table further comprises an actuator for actuating the bearing rail in a controllable rotary motion. The actuator is arranged between the connecting element and the rotary table wherein the rotary table is fixed with the bearing rail. The rotary table is pivotable around a longitudinal axis of the cylinder liner by the actuator. The actuator preferably is a step motor, but can also be another swivel motor which rotary motion is controlled by an encoder or at least one position sensor and an appropriate controller. In case of the use of a step motor the controllable rotary motion of the actuator can be controlled by trigger pulses for the step motor and additionally may be further controlled by an encoder or by using at least one position sensor and a corresponding controller.

The rotary table is pivot-mounted on a connecting element for establishing a detachable connection with a surface area of the combustion engine, in particular with the upper surface of a piston of a reciprocating piston engine. The upper surface of the piston means the surface facing the combustion chamber of the cylinder of the reciprocating piston engine whose cylinder liner has to be inspected. The connecting element preferably is an electromagnet having a solenoid.

The tools for measuring the inner diameter and the running surface of the cylinder liner are laser displacement measurement tools, in particular laser displacement measurement tools working by the triangulation principle of measurement. Those laser displacement measurement tools require a digital signal processor. The digital signal processor may be part of the control device, or may be a separate device, or the signal processor may be directly mounted on the bearing rail, or may be an integral part of the laser displacement measurement tool.

The laser displacement measurement tools are designed and arranged for measuring the inner diameter of the cylinder liner perpendicular to the longitudinal axis of the cylinder liner. Therefore, the lasers of the laser displacement measurement tools preferably are arranged to be mainly aligned with the longitudinal axis of the inspection tool. Consequently the laser light is emitted and the reflected light is received mainly in the direction of the longitudinal axis of the inspection tool. The longitudinal axis of the inspection tool runs parallel to the longitudinal axis of the bearing rail.

The inspection tool comprises at least two laser displacement measurement tools that are mounted on the bearing rail at opposite ends thereof. The laser displacement measurement tools are arranged for measuring the inner diameter of the cylinder liner perpendicular to the longitudinal axis of the cylinder liner. Hereby it is not required that the bearing rail, or the two laser displacement measurement tools respectively, are centralized exactly relative to the longitudinal axis of the cylinder liner, because the distance between the appropriate end of the bearing rail and the running surface of the cylinder liner is measured on both ends of the inspection tool and a signal processor continuously corrects the position variation.

In a preferred embodiment, a third laser displacement measurement tool is mounted on the bearing rail. This further measurement tool is designed and arranged for measuring the distance parallel to the longitudinal axis of the cylinder liner between the bearing rail and the cylinder cover. This laser displacement measurement tool preferably works by using the triangulation principle of measurement in combination with a digital signal processor. The digital signal processor may be part of the control device, or may be a separate device, or the signal processor may be directly mounted on the bearing rail, or may be an integral part of the laser displacement measurement tool.

The inspection tool comprises further a visual inspection tool for inspecting the surface condition of the running surface of the cylinder liner. The visual inspection tool preferably is a camera, in particular a self illuminating camera, mounted on the bearing rail. The visual inspection tool advantageously is directed towards the running surface of the cylinder liner in an acute angle to the longitudinal axis of the bearing rail.

The laser displacement measurement tools, i.e. the laser displacement measurement tools for measuring the diameter of the cylinder liner and the laser displacement measurement tool for measuring the vertical position of the piston or the distance between the bearing rail and the cylinder cover respectively, preferably are cooled by a coolant, e.g. by air or water provided through a hose. The visual inspection tool and the actuator of the rotary table may also be cooled by a coolant as e.g. air or water. The coolant may be provided by a compressor or pump and a cooler unit, all sited outside from the cylinder liner to be inspected. Delivering the coolant to the tools of the inspection tool to be cooled is done by using at least one hose.

Power for the measuring tools, namely the laser displacement measurement tools and the visual inspection tool, as well as for the actuator and the connecting element (electromagnet) is provided through electrical cables from outside the cylinder liner. The inspection device further comprises signal transmission means to transmit the measuring and control signals from the measurement tools and actuator to the control device and vice versa. Those transmission means may comprise transmitters and receivers, or in a simple way may consist of electrical cables.

In a preferred embodiment, the bearing rail consists of several part elements, in particular three part elements, namely a central drive part element and two exterior part elements. The use of part elements is due to the shortage of space usually available for introducing the inspection tool into the cylinder liner. The part elements are attachable to each other by frictional or form closure means using engaging coupling parts.

The method of inspecting a running surface of a cylinder liner of a combustion engine without the need for removing or lifting the cylinder cover according to the invention uses an inspection device as described above. The method is particularly suitable for inspecting a cylinder liner of a reciprocating piston combustion engine, and in particular of a two stroke large diesel engine with longitudinal scavenging.

The method according to the invention includes the consecutive steps of stopping the engine, lowering the piston in the cylinder liner to be inspected in the vicinity of the bottom dead center (BDC) and uncovering at least one of the air intake ports of the cylinder whose cylinder liner has to be inspected. The starting air valve and/or the exhaust valve has to be removed and in a further step the connection means for power supply and transmission of the measurement and control signals of the sensors, visual inspection tool and the actuator of the rotary table, and coolant supply means are inserted into the cylinder liner through the at least one uncovered starting air valve bore or exhaust valve port and are taken out through the at least one uncovered air intake port. Preferably, only the starting air valve bore and one of the air intake ports are uncovered. The inspection tool is then connected with the connection means and introduced with the cables and hoses into the cylinder liner through the uncovered air intake port, and the inspection tool is then placed onto the upper side of the piston where the rotary table of the inspection tool is pivotably and detachably connected to the piston upper side. The diameter of the cylinder liner transverse to the longitudinal axis of the cylinder liner is then measured and the surface condition is visually inspected for a predefined number of angles of rotation of the bearing rail around the longitudinal axis of the cylinder liner at one position relating to the longitudinal axis of the cylinder liner with respect to the distance between the bearing rail and the cylinder cover. The piston is then moved towards its top dead center (TDC) in a number of steps wherein at each step the diameter of the cylinder liner is measured and the surface condition of the running surface is visually inspected repeatedly for a predefined number of angles of rotation of the bearing rail around the longitudinal axis of the cylinder liner.

In another embodiment of the invention, only one air intake port is uncovered and the inspection tool pre-connected with the connection means is introduced into the cylinder liner through the one uncovered air intake port.

The number of circumferential positions of the bearing rail around the longitudinal axis of the cylinder liner for measuring the diameter of the cylinder liner is between 3 and 10, and in particular between 4 and 8. The number of circumferential positions hereby means the predefined number of angles of rotation of the bearing rail around the longitudinal axis of the cylinder liner at one position relating to the longitudinal axis of the cylinder liner with respect to the distance between the bearing rail and the cylinder cover.

In a preferred embodiment of the method the running surface of the cylinder liner to be inspected is one of a cylinder of a reciprocating piston combustion engine of a two stroke large diesel engine with longitudinal scavenging in which cylinder a piston is arranged movably to and fro along the running surface.

After stopping a two stroke large diesel engine, the turning gear, i.e. the crank, can be switched in and one can turn the engine (crank) till the piston of the "to be inspected" liner is in vicinity of the BDC. The exhaust and/or the starting air valve have to be opened manually. The starting air and/or the exhaust valve of this unit have to be removed. The cables for the electromagnet, actuator of the rotary table, sensors and camera, and the cooling hose as well as a holding-up wire for all those connection means, can then be lowered through the bore of the starting air valve. The lowering of those connection means may be performed using a deflection pulley and a balancer arranged above the cylinder cover. The scavenge air receiver has to be opened so the scavenge ports in the liner can be reached. The one ends of the connection means, i.e. cables and hoses, are then lying on the piston upper side. They can be caught with e.g. a welding wire and pulled through one of the air intake ports. Then, the wires have to be connected to the inspection tool. Because of the shortage of space, the arm of the inspection tool, i.e. the bearing rail is divided into three parts. A first part element of the inspection tool can be brought in the liner through the scavenging port. With a simple "click" device, the other part elements of the inspection tool can be connected and be brought in completely. When the electromagnet is switched on, a test turn of the inspection tool can be made. Cooling air is supplied to the drive (actuator), camera and sensors.

A connection between the crank angle sensor and the encoder of the rotary table is made via connection means to the control device that may comprise a connection box module and a laptop. The sensors and camera have to be connected to the control device as well.

If everything functions according to settings, the inspection can be started by turning the engine (crank) until the sensors have reached the anti-polishing ring and the turning has to be switched in the reverse direction. The third laser is pointing to the exhaust valve and is an extra security for stopping the piston in time. If the inspection of the running surface and the measurements are satisfactory, the inspection tool can be taken out when the piston is again in the BDC.

The distance between the sensors of the laser displacement measurement tool and the liner surface is typically between about 15-20 mm. Exact centralizing of the inspection tool within the cylinder liner is not necessary because the distance is measured on opposite sides of the bearing rail and the software will continuously correct such an un-alignment.

Due to the clearance between the liner and piston, the center point of the piston can move in comparison with the center point of the liner. The center point is defined in regard to a cross-section perpendicular to the longitudinal axis of the cylinder liner. This does not influence the measurement because of the use of a sensor on both sides of the arm of the inspection tool.

The angle of rotation of the rotary table around the longitudinal axis of the cylinder liner is controlled. An encoder tells the exact position of the lasers of the laser displacement measurement tools in the horizontal direction. In the vertical direction a crank angle sensor and/or the upwards directed laser of a third laser displacement measurement tool may be used to measure the vertical position of the piston. The vertical position of the piston correlates to the position of the bearing rail of the inspection device because the inspection tool is affixed onto the upper side of the piston.

A complete 3D scan of the liner inside, i.e. the running surface of the cylinder liner, may be produced by a digital signal processor using corresponding software.

BRIEF DESCRIPTION OF THE DRAWINGS

The invention will be explained further in the following with the help of drawings which show.

DETAILED DESCRIPTION OF THE INVENTION

Figure 1:
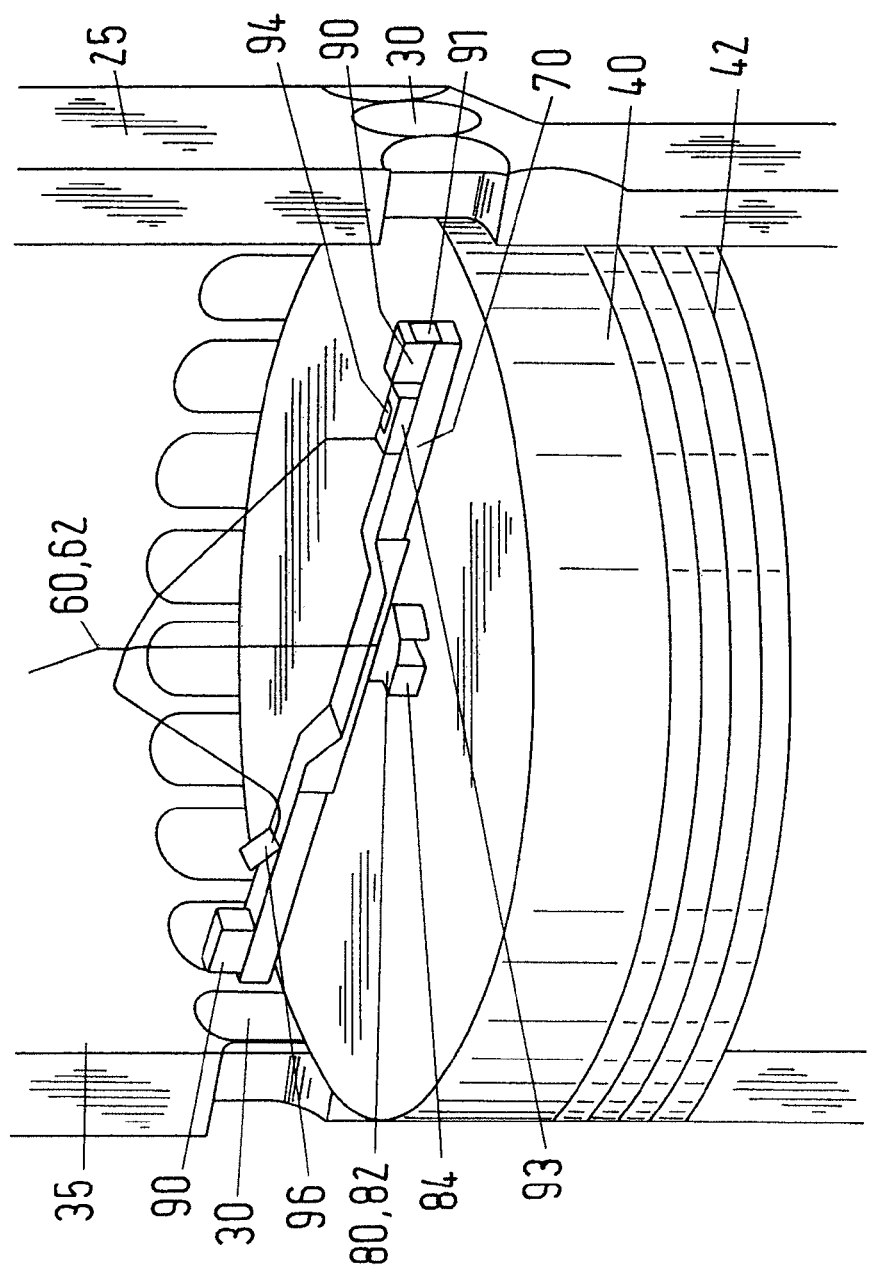
FIG. 1 schematically a perspective view of a part of a pistion of a combustion engine introduced into a cylinder liner having scavenging air ports.

FIG. 1 shows schematically a perspective view of an inspection tool 65 (see also FIG. 2) mounted onto the upper surface 45 of a piston 40, i.e. the surface area of the piston 40 facing the combustion chamber. The piston 40 exhibits a number of piston rings 42. The cylinder liner 25 shown in FIG. 1 is one of a cylinder of a reciprocating piston combustion engine of a two stroke large diesel engine with longitudinal scavenging and features a number of scavenging air ports 30. The inspection tool 65 shown in FIG. 1 for the most part is introduced into the cylinder liner 25 through one of the scavenging air ports 30 and lies onto the upper surface area 45 of the piston 40, i.e. the solenoid 84 of an electromagnet serving as detachable fastening tool of the inspection tool 65 lies onto the upper surface area 45.

The bearing rail 70 of the inspection tool 65 comprises at its central part a rotary table 80 that is mounted on the solenoid 84. The rotary table 80 further comprises an actuator 82 for actuating the bearing rail 70 in a controllable rotary motion. The actuator may be arranged between the solenoid of the detachable fastening tool and the rotary table 80, or may be arranged between the rotary table 80 and the bearing rail 70. The actuator 82 preferably is a step motor, but can also be another swivel motor which rotary motion is controlled by at least one position sensor (not shown) and a controller. In case of the use of a step motor the controllable rotary motion of the actuator 82 can be controlled by trigger pulses for the step motor and additionally may be further controlled by using at least one position sensor and a corresponding controller.

The inspection tool shown in FIG. 1 comprises on each exterior end of the bearing rail a laser displacement measurement tool 90. Those tools preferably are designed to work using the triangulation principle of measurement in combination with a digital signal processor. The digital signal processor may be part of the control device 55, or may be a separate device, or the signal processor may be directly mounted on the bearing rail 70, or may be an integral part of the laser displacement measurement tool 90.

The laser displacement measurement tools 90 are designed and arranged for measuring the inner diameter d of the cylinder liner 25 perpendicular to the longitudinal axis 1 of the cylinder liner 25. Therefore, the lasers 91 of the laser displacement measurement tools 90 preferably are arranged to be mainly aligned with the longitudinal axis q of the inspection tool 65. Consequently the laser light is emitted and the reflected light is received mainly in the direction of longitudinal axis q of the inspection tool 65. The longitudinal axis of the inspection tool 65 coincides with the longitudinal axis of the bearing rail 70, or those axis run parallel to each other.

The visual inspection tool for visual inspection of the surface condition of the running surface 35 of the cylinder liner 25 comprises a camera 96 being directed towards the running surface 35 in an acute angle of e.g. 20° to 50° to the longitudinal axis q of the bearing rail 70. The visual inspection tool 96 further comprises display means which may be part of the control device 55 or may be a separate device having a screen. The visual inspection device also comprises electrical connection means 60 for power supply and transmission of video signals. The transmission of video signals may also be performed by wireless transmission means (not shown). The power supply may also be accomplished by other means. The operation of the visual inspection tool usually requires cooling means. FIG. 1 shows an air hose 62 for air cooling of the camera and as the case may be for cooling the laser displacement tools 90, 93. The cooling of the visual inspection tool and the laser displacement measurement tools can also be effected using a fan or other means.

The inspection tool 65 shown in FIG. 1 further comprises a laser displacement measurement tool 93 having a laser 94 and a sensor arranged on an outer part of the right-hand exterior part element of the bearing rail 70. This laser displacement measurement tool 93 is designed and arranged for measuring the distance parallel to the longitudinal axis 1 of the cylinder liner 25 between the bearing rail 70 and the cylinder cover 15 (see FIG. 4). This laser displacement tool 93 preferably works by using the triangulation principle of measurement in combination with a digital signal processor. The digital signal processor may be part of the control device 55, or may be a separate device, or the signal processor may be directly mounted on the bearing rail, or may be an integral part of the laser displacement measurement tool 93. The laser displacement measurement tool 93 may be cooled by a coolant, e.g. by air provided through an air hose 62.

The bearing rail 70 shown in FIG. 1 comprises three part elements, namely a central drive part element 72 mounted on the rotary table 80 and two exterior part elements 74 on each side of the central part element 72. The exterior part elements 74 are fastened on the central drive part element 72 preferably by using detachable fasteners.

The central drive part element 72 has a flat underside and a trapezoid upper side. The central drive part element 72 may consist of a longitudinal plate having at its exterior parts on each side of the plate a mainly triangular sheet plate.

The exterior part elements 74 preferably are in the form of an u-rail. Using u-rails for the exterior part elements 74 ensure an ample rigidity of those part elements and allow for an easy lateral fixing of the displacement measuring tools and the camera.

Figure 2:
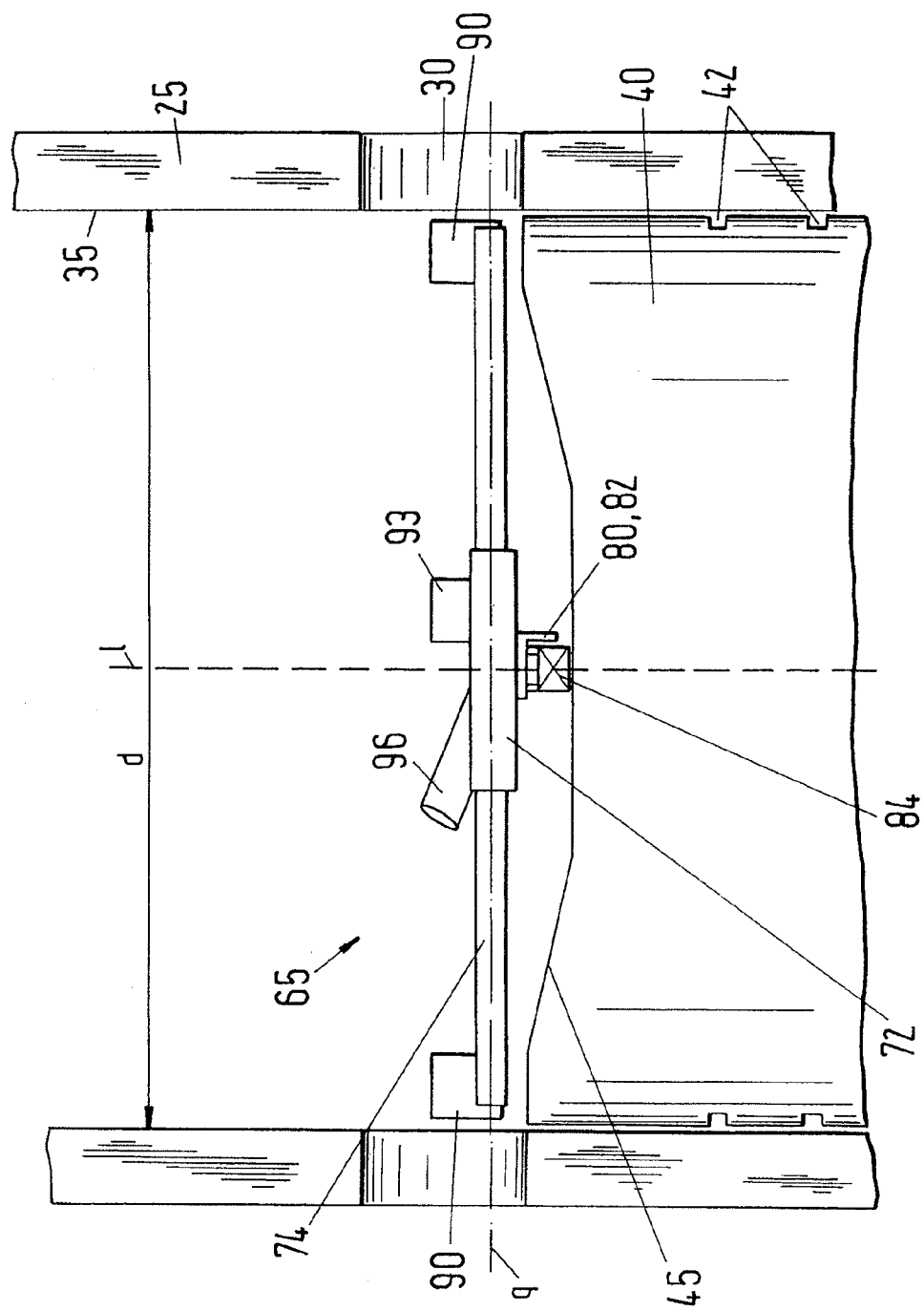
FIG. 2 schematically a longitudinal section through a cylinder of a combustion engine and an inspection tool according to the invention that is mounted onto the upper side of the piston.

FIG. 2 shows schematically a longitudinal section through a cylinder of a combustion engine and an inspection tool 65 according to the invention that is mounted onto the upper side 45 of the piston 40. The subject matter shown in FIG. 2 substantially is the same as that shown in FIG. 1, but the inspection tool 65 is completely introduced into the cylinder liner and the center of the bearing rail 70 is aligned with the longitudinal axis 1 of the cylinder liner 25.

The upper surface area 45 of the piston 40 facing the combustion chamber is recessed in that the middle part of the upper surface 45 lies lower than on the border area of the piston 40.

The bearing rail 70 of the inspection tool 65 shown in FIG. 2 has a u-shaped cross-section wherein its shape is such that the measuring and inspection tools 90, 93, 96 fit between the flanks of the u-profile. In contrast to the embodiment shown in FIG. 1 the laser displacement measurement tool 93 is positioned in the central area of the bearing rail 70, i.e. this tool for measuring the vertical distance between the bearing rail 70 and the cylinder cover 15 is mounted on the central drive part element 72 of bearing rail 70. Beside the arrangement of the laser displacement measurement tool 93 all other elements of the inspection tool correspond to those shown in FIG. 1. The actuator 82 is part of the rotary table 80.

Figure 3:
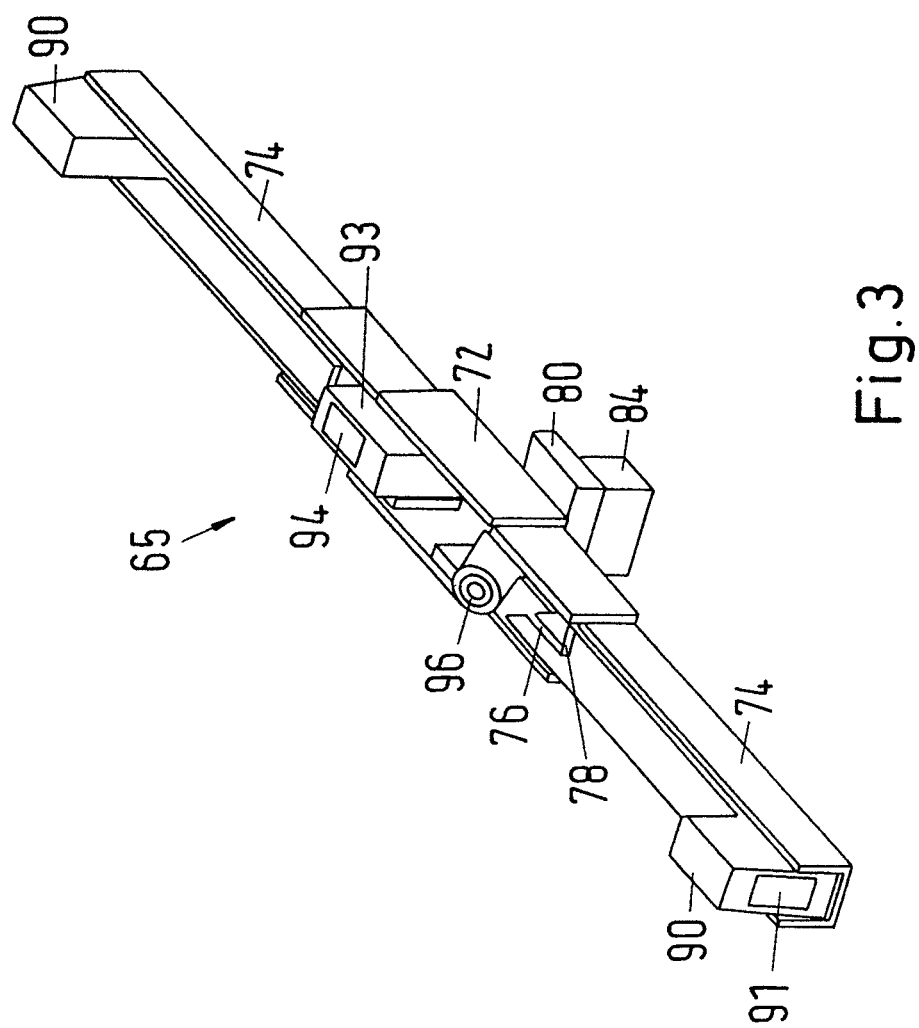
FIG. 3 schematically a perspective view of an inspection tool according to the invention.

FIG. 3 shows schematically a perspective view of an inspection tool 65 according to the invention. The inspection tool comprises a bearing rail 70 having a central drive part element 72 and two exterior part elements 74. The central drive part element 72 comprises three part elements which may be joint to each other in a fixed manner. The middle part element is affixed to the rotary table 80 which on its part is pivotable mounted to the electromagnet 84. All part elements of the bearing rail 70 are formed as u-profiles. The outer part elements of the central drive part element 72 each feature a rod-shaped plug-in element 78 arranged on the free end side of the profile and affixed between appropriate parallel flanks of the corresponding u-profile.

One outer part element of the central drive part element 72 comprises the visual inspection tool which preferably is a camera. The other outer part element of the central drive part element 72 comprises a laser displacement measurement tool 93 for measuring the vertical position, i.e. the position of the bearing rail 70 in respect to the cylinder cover 15. This laser displacement measurement tool 93 comprises a laser 94 and a sensor designed for emitting and receiving light mainly perpendicular to the bearing rail 70, i.e. parallel to the axis of rotation of the rotary table 80.

Each of the two exterior part elements 74 features on its inner side directed to the central drive part element 72 a plug-in slit 76 on each of the parallel flanks of its u-profile. On the side of the exterior part elements 74 opposite to the plug-in slits there are laser displacement measurement tools 90 mounted between the flanks of the u-profiles. Each of the laser displacement measurement tools 90 comprises a laser 91 and a sensor that are arranged to emit and receive light mainly aligned with the longitudinal axis q of the bearing rail 70, or perpendicular to the axis of rotation of the rotary table 80.

Figure 4:
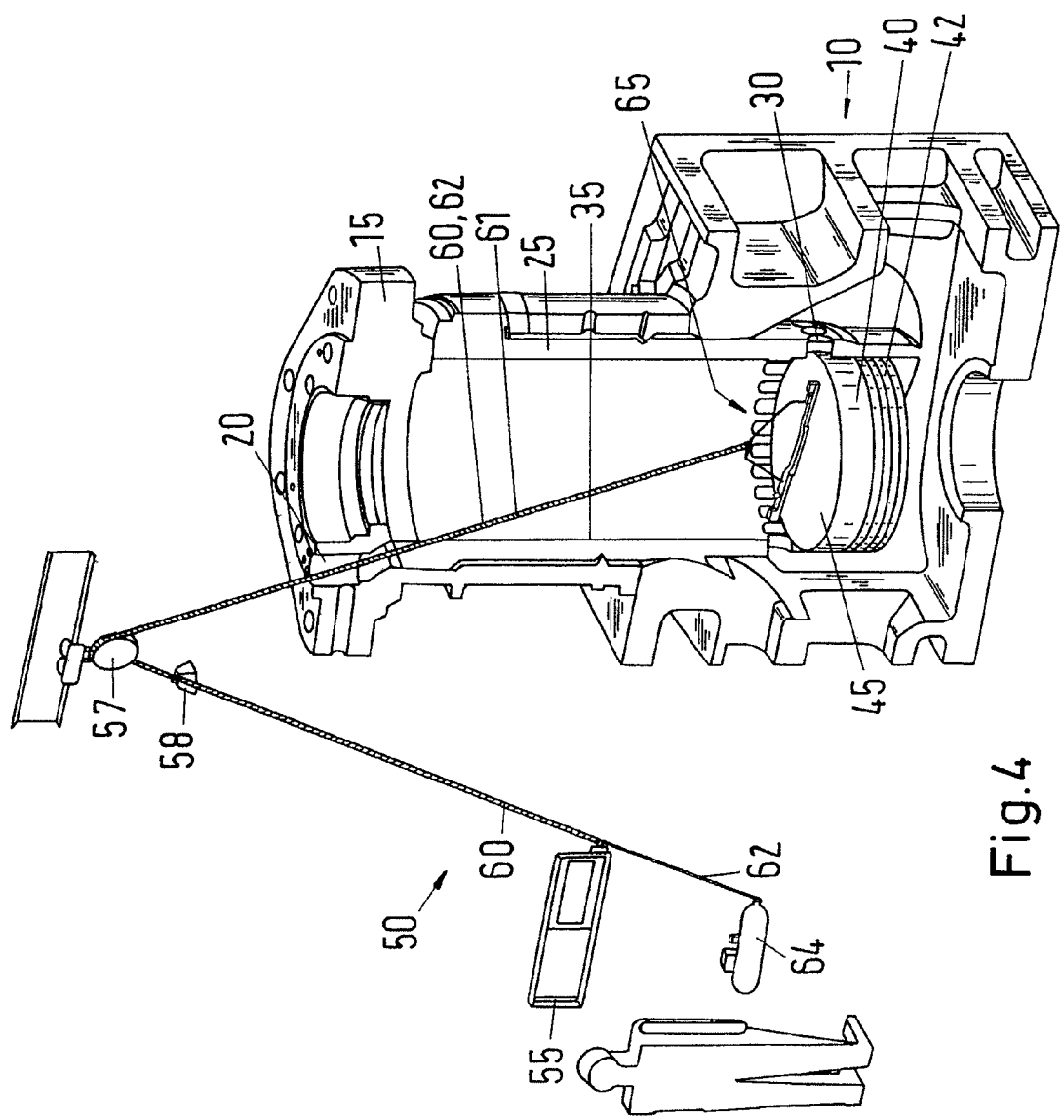
FIG. 4 a perspective view of longitudinal section of a part of a combustion engine and schematically an inspection device in a starting position of an inspection procedure.

FIG. 4 shows a perspective view of longitudinal section of a part of a combustion engine 10 and schematically an inspection device 50 according to the invention in a starting position of an inspection procedure. The combustion engine is a reciprocating piston combustion engine 10 of a two stroke large diesel engine with longitudinal scavenging in which cylinder a piston 40 is arranged movably to and fro along the running surface 35 of the cylinder liner 25. The piston 40 features a number of piston rings 42.

The cylinder liner has near its bottom dead center (BDC) a series of circumferentially arranged scavenging air ports 30. The inspection tool 65 has a size that allows its introduction into the cylinder liner 25 through one of those scavenging air ports 30 in the cylinder wall to be inspected.

The inspection tool 65 shown in FIG. 4 is detachably affixed on the surface area 45 of the upper side of the piston 40, i.e. on the side of the piston facing the combustion chamber. This connection of the inspection tool 65 with the piston 40 is done by an electromagnet 84.

The inspection device 50 comprises an inspection tool 65, a control device 55, cooling means 64, 62 for the tools 90 for measuring the inner diameter of the cylinder liner 25, the vertical position measuring tool 93, the visual inspection tool 96 and the actuator 82 of the rotary table 80 as the case may be. The inspection device further comprises electrical connection cables 60 for power supply and transmission of the measurement and control signals. Power supply is used for the actuator 82 of the rotary table 80, the electromagnet 84, the tools 90 for measuring the inner diameter d of the cylinder liner 25, the visual inspection tool 96 and the vertical position measuring tool 93. Transmission means for measurement and control signals are used for the actuator 82 of the rotary table 80, the tools 90 for measuring the inner diameter d of the cylinder liner 25, the visual inspection tool 96 and the vertical position measuring tool 93 and as the case may be for the electromagnet 84.

The electrical connection cables 60 and the cooling means, in particular the air hose 62, are introduced into the cylinder liner 25 trough the starting air valve bore 20 of the cylinder. Additionally, a holding-up wire 61 may be guided over a deflection pulley 57 and/or a balancer 58 above the cylinder cover 15 through the starting air valve bore 20. The holding-up 61 wire is used to lower the electrical connection cables 60 and cooling supply means, e.g. air hose 62 onto the upper surface 45 of the piston 40.

The power supply and signal transmission cables 60 are on the one hand connected to control device 55 and on the other hand to the inspection tool 65. A separate coolant supply device as e.g. a compressor with a cooling unit is used to deliver and discharge the coolant through the coolant line 62, in particular air hose 62, to and from the inspection tool 65.

The control device 55 further has a display and a storage unit for recording the measurements and visual inspection images.

The invention claimed is:

1. An inspection device for inspecting a running surface of a cylinder liner of a combustion engine, comprising:
    a control device;
    a connector for power supply and transmission of measuring data and control signals; and
    an inspection tool, comprising:
        a bearing rail;
        a rotary table mounted on the bearing rail; and
        tools mounted on the bearing rail, for measuring the inner diameter and running surface of the cylinder liner and for visual inspection of the surface condition; and
        a camera mounted on the bearing rail for visual inspection of the surface condition of the running surface of the cylinder liner;
    wherein the inspection tool has a size that allows introduction of the inspection tool into the cylinder liner through an aperture in the cylinder liner.

2. The inspection device in accordance with claim 1, wherein the inspection tool further comprises a laser displacement measurement tool mounted on the bearing rail, configured to measure the distance parallel to the longitudinal axis of the cylinder liner between the bearing rail and the cylinder cover.

3. The inspection device in accordance with claim 1, wherein the bearing rail comprises a central drive part element and two exterior part elements, the part elements being attached to each other by frictional or form closures using engaging coupling parts.

4. The inspection device in accordance with claim 1, further comprising an electronic control device wherein the connector transmits measurements and control signals of the tools.

5. Use of the inspection device according to claim 1 for the inspection of the running surface of the cylinder liner of a cylinder of the combustion engine, wherein the combustion engine is a reciprocating piston combustion engine of a two stroke large diesel engine with longitudinal scavenging, wherein a piston is disposed in the cylinder movably to and fro along the running surface, wherein the size of the inspection tool allows introduction of the inspection tool into the cylinder liner through a scavenging air port in the cylinder liner.

6. The inspection device in accordance with claim 1, wherein the camera is directed towards the running surface in an acute angle to the longitudinal axis of the bearing rail.

7. The inspection device in accordance with claim 1, further comprising an air hose for cooling purposes.

8. The inspection device in accordance with claim 1, wherein the tools for measuring the inner diameter and the running surface of the cylinder liner comprise at least two laser displacement measurement tools.

9. The inspection device in accordance with claim 8, wherein the two laser displacement measurement tools are mounted on the bearing rail at opposite ends thereof, and the laser displacement measurement tools are configured to measure the inner diameter of the cylinder liner perpendicular to the longitudinal axis of the cylinder liner.

10. The inspection device in accordance with claim 8, wherein the laser displacement measurement tools work by triangulation.

11. The inspection device in accordance with claim 1, further comprising an actuator, wherein the rotary table is drivable around a longitudinal axis of the cylinder liner by the actuator, and wherein the position of rotation of the rotary table around the longitudinal axis is controllable by the actuator.

12. The inspection device in accordance with claim 11, wherein the actuator comprises a step motor with an encoder, and wherein the position of rotation of the rotary table around the longitudinal axis is controllable by the encoder.

13. The inspection device in accordance with claim 11, wherein the actuator comprises position sensors, and wherein the position of rotation of the rotary table around the longitudinal axis is controllable by the position sensors.

14. The inspection device in accordance with claim 11, further comprising a connecting element, wherein the rotary table is pivot-mounted on the connecting element for establishing a detachable connection with a surface of the combustion engine.

15. The inspection device in accordance with claim 14, wherein the connecting element comprises an electromagnet.

16. The inspection device in accordance with claim 14, wherein the surface of the combustion engine comprises an upper surface of a piston facing the combustion chamber of the cylinder liner.

17. A method of inspecting a running surface of a cylinder liner of a combustion engine using an inspection device,
    the inspection device comprising:
        a control device;
        a connector for power supply and transmission of measuring data and control signals; and
        an inspection tool, comprising:
            a bearing rail;
            a rotary table mounted on the bearing rail; and
            tools mounted on the bearing rail, for measuring the inner diameter and running surface of the cylinder liner and for visual inspection of the surface condition; and
            a camera mounted on the bearing rail for visual inspection of the surface condition of the running surface of the cylinder liner;

wherein the inspection tool has a size that allows introduction of the inspection tool into the cylinder liner through an aperture in the cylinder liner;

the method comprising, after stopping the engine:
- moving a piston in the cylinder liner towards the vicinity of the bottom dead center (BDC);
- uncovering at least one of an air intake port, starting air valve bore, and exhaust valve port of the cylinder liner;
- introducing the connector and the inspection tool into the cylinder liner through the at least one air intake port, starting air valve bore, and/or exhaust valve port;
- placing the inspection tool onto the upper side of the piston;
- pivotably and detachably connecting the rotary table of the inspection tool to the piston upper side;
- measuring the diameter of the cylinder liner transverse to the longitudinal axis of the cylinder liner and visually inspecting the surface condition for a predefined number of angles of rotation of the bearing rail around the longitudinal axis of the cylinder liner at one position relating to the longitudinal axis of the cylinder liner with respect to the distance between the bearing rail and a cylinder cover; and
- stepwise moving the piston towards its top dead center (TDC), comprising, at each step, measuring the diameter of the cylinder liner and visually inspecting the surface condition of the running surface for a predefined number of angles of rotation of the bearing rail around the longitudinal axis of the cylinder liner.

18. The method according to claim 17, wherein the number of angles of rotation of the bearing rail is between 3 and 10.

19. The method according to claim 17, wherein the running surface of the cylinder liner is a running surface of a cylinder of a reciprocating piston combustion engine.

20. The method according to claim 17, wherein the running surface of the cylinder liner is a running surface of a cylinder of a reciprocating piston combustion engine of a two stroke large diesel engine with longitudinal scavenging in which cylinder the piston is disposed movably to and fro along the running surface;
- wherein the uncovering comprises uncovering the starting air valve bore by removing or opening a starting air valve;
- wherein introducing the connector into the cylinder liner comprises introducing the connector through the starting air valve bore; and
- wherein introducing the inspection tool comprises introducing the inspection tool through the air intake port.

21. The method according to claim 17, further comprising using a laser displacement measurement tool for measuring the distance parallel to the longitudinal axis of the cylinder liner between the bearing rail and the cylinder cover.

22. The method according to claim 17, wherein the number of angles of rotation of the bearing rail is between 4 and 8.

* * * * *